(12) United States Patent
Kalakodimi et al.

(10) Patent No.: US 11,919,784 B2
(45) Date of Patent: Mar. 5, 2024

(54) METHODS FOR PREDICTING AND MONITORING SCALE FORMATION IN INDUSTRIAL WATER SYSTEMS

(71) Applicant: CHEMTREAT, INC., Glen Allen, VA (US)

(72) Inventors: Rajendra Prasad Kalakodimi, Glen Allen, VA (US); Santanu Banerjee, Glen Allen, VA (US); Tzong Du, Glen Allen, VA (US)

(73) Assignee: CHEMTREAT, INC., Glen Allen, VA (US)

(*) Notice: Subject to any disclaimer, the term of this patent is extended or adjusted under 35 U.S.C. 154(b) by 170 days.

(21) Appl. No.: 17/364,303

(22) Filed: Jun. 30, 2021

(65) Prior Publication Data

US 2022/0073371 A1    Mar. 10, 2022

Related U.S. Application Data

(60) Provisional application No. 63/074,576, filed on Sep. 4, 2020.

(51) Int. Cl.
*C02F 1/00* (2023.01)
*C02F 5/14* (2023.01)

(52) U.S. Cl.
CPC ............ *C02F 1/008* (2013.01); *C02F 5/14* (2013.01); *C02F 2209/02* (2013.01); *C02F 2209/055* (2013.01); *C02F 2209/06* (2013.01)

(58) Field of Classification Search
None
See application file for complete search history.

(56) References Cited

U.S. PATENT DOCUMENTS

| | | | |
|---|---|---|---|
| 6,645,428 B1 | 11/2003 | Morris et al. | |
| 7,601,789 B2 | 10/2009 | Morris et al. | |
| 2005/0061753 A1 | 3/2005 | Dickinson | |
| 2007/0125987 A1* | 6/2007 | Hills | C23F 14/00 422/7 |
| 2014/0083949 A1* | 3/2014 | Takahashi | C02F 1/20 210/96.1 |
| 2020/0079673 A1 | 3/2020 | Gottschalk et al. | |

* cited by examiner

*Primary Examiner* — Richard C Gurtowski
(74) *Attorney, Agent, or Firm* — Oliff PLC

(57) ABSTRACT

A method includes varying at least one condition of water in a water system while (i) measuring an amount of deposit control agent (DCA) in the water to detect a change in the amount of DCA in the water; and (ii) measuring scaling in the water system to detect a change in the amount of scaling; and correlating the detected change in the measured amount of DCA with the detected change in scaling in the water in order to predict and monitor the onset of scaling.

15 Claims, 3 Drawing Sheets

METHODS FOR PREDICTING AND MONITORING SCALE FORMATION IN INDUSTRIAL WATER SYSTEMS

This nonprovisional application claims the benefit of U.S. Provisional Application No. 63/074,576, filed Sep. 4, 2020.

BACKGROUND

Industrial water systems use water sources of variable quality. The water sources include different dissolved cations and anions, which can combine to form mineral salts known as scale and deposit. Mineral scaling is perhaps one of the most common and detrimental problems throughout all water treatment applications, from reverse osmosis processes, to boiler applications, to cooling towers. In cooling water systems, scaling reduces the efficiency of heat transfer and the carrying capacity of the water distribution system. It can also cause oxygen differential cells to form. These cells accelerate corrosion and lead to process equipment failure.

Scale deposits are formed by precipitation and crystal growth at a surface contacting water. Precipitation occurs when the solubility of a salt is exceeded either in the bulk water or at the surface. The most common scale-forming salts that deposit on heat transfer surfaces are those that exhibit retrograde solubility with temperature (e.g., calcium carbonate, calcium phosphate, and magnesium silicate). These salts may be completely soluble in the lower-temperature bulk water, but will supersaturate in the higher-temperature water adjacent to the heat transfer surface, and thus will precipitate on the surface. Accordingly, the operating conditions of the water system (e.g. pH, temperature, flow rate) determine the scaling potential of mineral salts.

For example, when water contains both calcium ions and carbonate or bicarbonate alkalinity, the carbonate and bicarbonate alkalinity will react with the calcium to form calcium carbonate. The calcium carbonate salt has a lower solubility at higher temperatures. Thus, the calcium carbonate will be prone to form scales in higher temperature environments, such as at heat exchanger surfaces.

Currently there are no reliable methods to detect and measure scale formation. Often times, a facility will not detect scale formation unless the facility opens up the heat exchanger at a frequent interval or if there is loss of heat exchanger performance.

In some cases, facilities have installed deposit monitors, but the operating conditions of these deposit monitors cannot exactly duplicate the conditions of an actual heat exchanger surface.

Current offline methods for monitoring scale formation are time-consuming and typically require offsite analysis. For example, a water sample can be taken from the operating system and sent to an offsite laboratory for analysis. Scaling can be detected by analyzing filtered (through 0.45 or 0.2 μm pore filters) and unfiltered analytes, such as Ca, $PO_4$, silica, etc. Although some reagent-based methods can be performed onsite, these methods are only semi-quantitative and do not reflect the degree of precipitation.

Scale formation can be inhibited by operating at subsaturation conditions, where scale-forming salts are soluble. For some salts, scaling can be sufficiently mitigated by controlling water hardness or pH. However, in most cases, high blowdown rates and low pH are required so that solubilities are not exceeded at the heat transfer surface. It is also necessary to maintain precise control of pH and concentration cycles. Even minor variations in water chemistry or heat load can result in scaling.

Alternatively, scale formation can be controlled using deposit control agents (DCAs). The DCAs can be chemical additives, such as sequestering agents and chelates that are capable of forming soluble complexes with metal ions. The complexes do not precipitate as readily as the metal ions. Examples include ethylenediaminetetraacetic acid (EDTA) for chelating calcium hardness, and polyphosphates for iron. However, this treatment approach requires stoichiometric chemical quantities, and its use is limited to waters containing low concentrations of the metal.

An alternative approach uses DCAs that inhibit precipitation at dosages far below the stoichiometric level required for sequestration or chelation. These materials, known as threshold inhibitors, affect the kinetics of the nucleation and crystal growth of scale-forming salts, and permit supersaturation without scale formation. The most commonly used threshold inhibitors are low molecular weight acrylate polymers and organophosphorus compounds (phosphonates). Selection of a specific inhibitor depends on the precipitating species and its degree of supersaturation.

DCAs are typically metered into the water in proportion to blowdown water flow. In the case of cooling towers, the DCA is typically introduced in the sump, where the cooling water is stored. In order to ensure effective scaling prevention, the concentration of DCA in the circulating water must be monitored over time to ensure that the DCA dosing is maintained at adequate levels. For example, the DCA dosing might need to be adjusted over time as operating conditions—such as pH and temperature—change. Other conditions could theoretically also affect DCA levels, such as interactions between the DCA and any suspended solids such as silt that might be present in the water.

Though there are methods to measure DCA levels in the water, there is no direct method to measure the performance of the DCAs and hence to predict onset of scaling.

Thus, there is a need for real-time on-site monitoring of scale formation using a reagent-less method.

SUMMARY

The disclosed embodiments relate to a method for predicting and detecting the onset of mineral scale formation in an industrial water system using a DCA. This method immensely improves monitoring and control of the performance of water treatment chemicals, and provides economic advantages due to factors such as optimization of chemical dosage and water savings. The method can accurately predict when a deposition issue might arise in the water system, and mitigate it by adjusting the dose rate of the DCA. This is especially useful during process upsets.

In one aspect, this disclosure provides a method that includes varying at least one condition of water in a water system while (i) measuring an amount of DCA in the water to detect a change in the amount of DCA in the water; and (ii) measuring scaling in the water system to detect a change in the amount of scaling; and correlating the detected change in the measured amount of DCA with the detected change in scaling in the water.

DETAILED DESCRIPTION OF EMBODIMENTS

Figure 1:
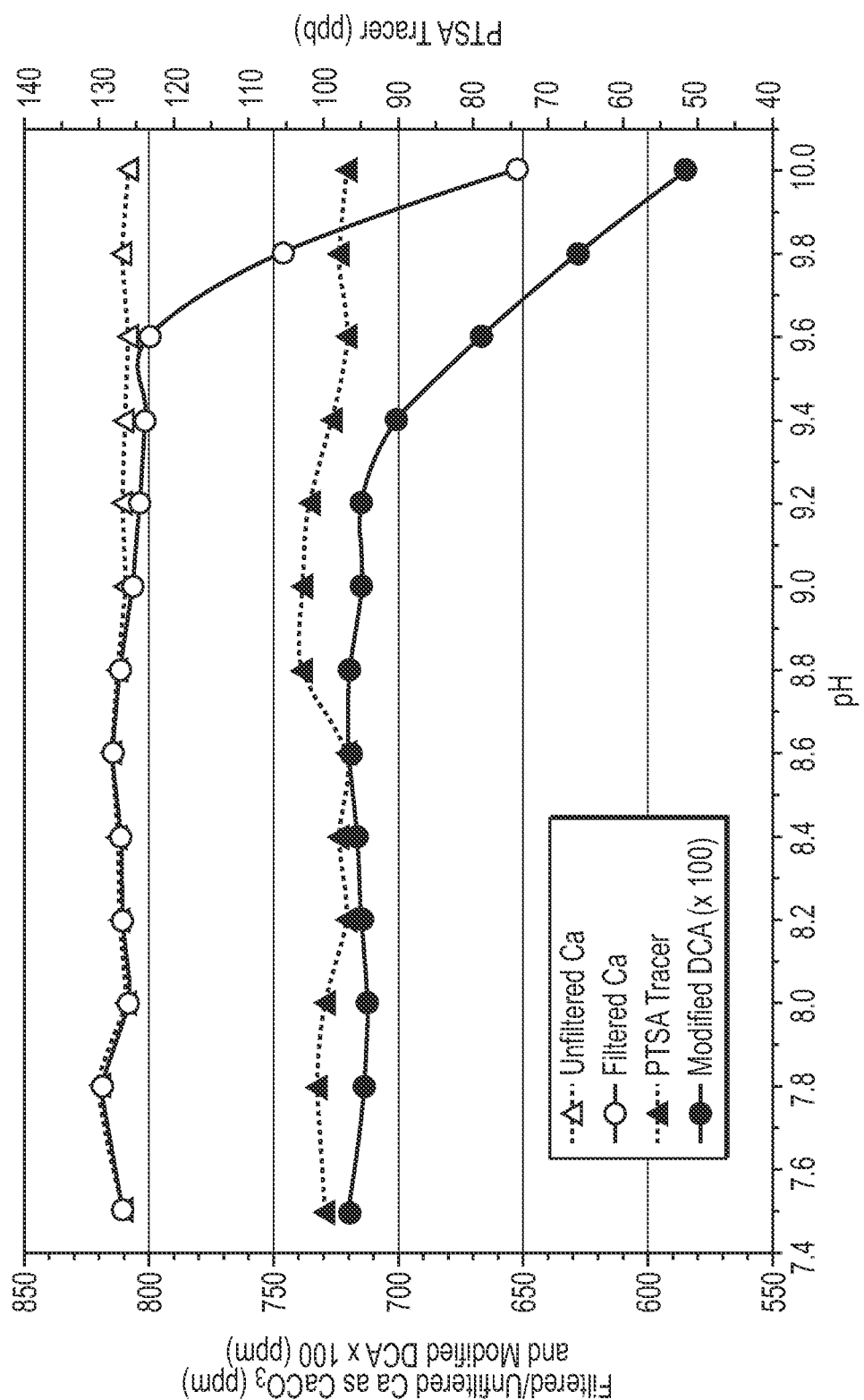
FIG. 1 is a graph illustrating the effect of $CaCO_3$ scale formation on modified DCA concentration as compared to an inert tracer with ~800 ppm Ca as $CaCO_3$ in the water.

The disclosed embodiments include a method of correlating a threshold change in a measured amount of DCA in water with changes in scaling in the water under variable conditions. The disclosed embodiments also include a method for monitoring and treating scale formation in an industrial water system, such as a cooling water tower. The methods can be used for monitoring and treating various mineral scales such as, but not limited to, calcium carbonate, calcium phosphate, calcium oxalate, magnesium hydroxide, and calcium sulfate. In particular, the scale may be formed from deposits of calcium carbonate ($CaCO_3$) or calcium phosphate ($Ca_3(PO_4)_2$).

Depending on the water chemistry, the water might be more or less susceptible to forming different types of scale under different operating conditions. Typical cooling water and makeup water may have a water chemistry including Ca as $CaCO_3$, Mg as $CaCO_3$, M-alkalinity as $CaCO_3$, $SO_4^{2-}$, and $Cl^-$, each in amounts ranging independently from 20 ppm to 2,000 ppm, 50 ppm to 1,500 ppm, 80 ppm to 1,000 ppm, 100 ppm to 800 ppm, 200 ppm to 600 ppm, or 300 ppm to 400 ppm, for example. The water chemistry may include O—$PO_4$ in amounts ranging from 0.1 ppm to 30 ppm, 0.5 ppm to 25 ppm, 1 ppm to 20 ppm, or 5 ppm to 15 ppm, for example. Other ionic species can also be included.

The DCA can inhibit scale formation in the water. For example, the DCA can affect the kinetics of the nucleation and crystal growth of scale-forming salts, and permit supersaturation without scale formation. In particular, the DCA may be a polymer or non-polymeric phosphorous-containing chemical (e.g., a phosphonate, phosphinate, or polyphosphate) that inhibits scale formation by an adsorption mechanism. As ion clusters in solution become oriented, metastable microcrystallites (highly oriented ion clusters) are formed. At the initial stage of precipitation, the microcrystallite can either continue to grow (forming a larger crystal with a well-defined lattice) or dissolve. The DCA could prevent precipitation by adsorbing on the newly emerging crystal, blocking active growth sites. This would inhibit further crystal growth and favor dissolution. The precipitate would dissolve and release the DCA, which would then be free to repeat the process.

The DCA may be a modified DCA (sometimes referred to as "active DCA" or "tagged DCA"), which includes a detectable component in order to facilitate detection. The component may be chemically or optically detectable. In the case of a polymeric DCA, the modified DCA may be formed by adding a small amount of a detectable monomer to the backbone of the polymeric DCA during polymerization of the DCA polymer. The DCA polymer may be a branched molecule having highly electronegative groups (e.g., —OH). Salts in the water (e.g., $CaCO_3$, $Ca_3(PO_4)_2$) are positively charged, and thus the DCA polymer will adsorb onto the forming salt crystal and prevent the crystal from growing to a critical point initiating precipitation.

The polymeric DCA is preferably a polymer containing carboxylic, sulfonate, amide, and/or hydroxide functional groups, and may be a homopolymer, copolymer, or terpolymer. The polymer is preferably a low molecular weight acrylate polymer having a weight-average molecular weight of 15,000 g/mol or less (e.g., from 1,000 to 10,000 g/mol, or from 1,000 to 5,000 g/mol). The choice of DCA may depend on the water chemistry and expected type of scale formation. For example, a DCA with carboxylic acid functionality can be used for inhibiting carbonates (e.g., $CaCO_3$) and sulfates, and DCA with sulfonic acid functionality can be used for inhibiting phosphates (e.g., $Ca_3(PO_4)_2$).

The detectable monomer is detectable real-time. For example, the detectable monomer may be a fluorescent monomer that is detectable using a fluorometer. The fluorescence intensity can be measured and converted to calculate the amount of polymer. The detectable fluorescent monomer may be, for example, a naphthalene-based monomer. The amount of detectable monomer in the modified DCA may be less than 5 mol %, such as from 0.001 to 2.5 mol %, from 0.01% to 1 mol %, or from 0.1% to 0.5 mol %.

The DCA can be introduced into the water system at any location. For example in a cooling water system, the DCA can be injected into the sump, and then monitored in the circulating water downstream of the sump. It can be added continuously or intermittently.

The DCA can be injected in many different forms, such as in essentially pure form (e.g., a solution containing 95%, 99%, or even 100% DCA), or as a solution of water containing 0.1 to 80 wt %, 0.5 to 50 wt %, or 1 to 30 wt % of the DCA, for example. The solution can contain other components, such as corrosion inhibitors. The amount of DCA in the cooling water (e.g., the water stored in the sump) can range from 0.05 ppm to 60 ppm, 0.1 ppm to 50 ppm, 1 ppm to 40 ppm, or 2 ppm to 20 ppm, for example. The desired amount of DCA may depend on the operating conditions, such as the water pH, temperature, and water chemistry.

DCA levels in the water can be monitored at any location downstream of where the DCA was introduced. For example, the DCA levels can be monitored in water circulating in a bypass loop positioned between the sump and water entering the facility. Other parameters can be measured at the same location. For example, a panel of probes can monitor pH, temperature, corrosion, and fluorescent signal (e.g., using a fluorescent probe), and relay the detected information to a controller, e.g., wirelessly via bluetooth. The controller can automatically adjust parameters such as the dosing of the DCA or blowback cycle time in response to the detected information. In the case of polymeric DCA modified with a fluorescent monomer, the DCA can be monitored using a fluorescent probe.

The amount of DCA in the circulating water can be measured continuously, or at intervals with a testing frequency of 20-, 40-, or 60-minute intervals, or every 2 days, 1 week, or 30 days for example.

The inventors surprisingly found that DCA levels in the circulating water are correlated with scale formation and thus can be used to precisely predict the onset of scale formation at very early stages, particularly when using polymeric DCAs. Without intending to be bound by theory, it is believed that the salt precipitate (scale) incorporates some of the DCA once the salt crystal is large enough to precipitate. However, the same degree of DCA sequestration was not observed with other non-scale solids. Accordingly, scale formation can be predicted based on whether the detected amount of DCA decreases (or by how much). Appropriate treatment can then be assumed, such as by adding more DCA, or by adjusting the water temperature, pH, or salt concentration (e.g., by introducing more makeup water).

For example, if the detected amount of DCA decreases by a certain threshold amount (e.g., 0.1 ppm, 0.25 ppm, 0.5 ppm, or 1 ppm or more), drops below a certain threshold amount (e.g., 1 ppm, 5 ppm, 10 ppm, 15 ppm, or 20 ppm), or drops at a rate that exceeds a certain threshold (e.g., by any of the previously mentioned amounts per 1 hr, 5 hrs, 10 hrs, or 24 hrs), it can be determined that scale formation has begun or is imminent.

The threshold indicative of scaling can be determined by monitoring the relationship between an amount of DCA (or decrease in DCA) in the water and the occurrence of scaling. For example, water under variable conditions (e.g., water chemistry, pH, temperature, flow rate) can be monitored for both the occurrence of scaling and the amount of DCA. A particular amount of DCA will be correlated with scale formation under those conditions where scaling has been observed to have occurred. It can therefore be determined which threshold operating value or threshold change in the measured amount of DCA coincides with a detected change in scaling, signaling that scaling is occurring or will occur imminently. The threshold values can be considered to substantially coincide with the onset of scaling within a range of values at which there is no statistically significant difference in the detection of scaling. These observations can be performed in situ (within the circulating water of the industrial water system of interest), or with an external experimental set-up using a representative water sample having similar properties as the water circulating in the industrial water system.

The occurrence of scaling can be monitored in these systems or in a laboratory sample by measuring an amount of scale-forming salt or ionic species in the water, or by filtering the water to detect precipitated scale-forming salts. For example, the total amount of scale-forming cations (the "unfiltered" amount) in a water sample can be measured by inductively coupled plasma (ICP) spectrometry. The sample can then be filtered through 0.2 or 0.4 μm filter paper to separate any scale-forming salts, and the amount of cations (the "filtered" amount) can be again measured by ICP spectroscopy in the filtered sample. A threshold difference between the filtered and unfiltered amounts can be indicative of scaling. For example, the threshold difference may be 1%, 2%, 5%, 10%, or 15%, If scaling is detected, adjustments can be made to the system to mitigate the scaling. For example, one or more operating parameters of the industrial water system can be adjusted to decrease scale formation in the circulating water. Operating parameters include the pH of the water, the temperature of the water, the mineral hardness of the water, and the dosage of the DCA added to the water, for example.

Because scaling can be predicted so quickly and accurately, the water system could be operated at a higher operating pH without risking scale formation. Water will become naturally less corrosive at higher pH. But industries tend to control the pH of the water to lower pH values due to potential scaling issues and due to lack of an online measurement of onset of scaling.

EXAMPLES

Example 1

Effect of $CaCO_3$ Scale Formation on Modified DCA Concentration

The influence of scale formation, and particularly $CaCO_3$ precipitation, was monitored with respect to modified DCA concentration as compared to an inert tracer.

Both a modified polymeric DCA and an inert fluorescent tracer were added to water with a water chemistry containing 800 ppm Ca as $CaCO_3$, 400 ppm Mg as $CaCO_3$, 100 ppm M-alkalinity as $CaCO_3$, 400 ppm $SO_4^{2-}$, 400 ppm $Cl^-$. In particular, 7.5 ppm modified DCA and 100 ppb 1,3,6,8-pyrenetetrasulfonic acid (PTSA) as the inert tracer were added to the water at 50° C. The solution was then titrated with 1N NaOH to increase the pH steadily.

At each pH, the amounts of modified DCA and PTSA were measured with a fluorometer. The total amount of calcium ions ("unfiltered calcium") was measured by ICP spectrometry. The sample was then filtered through 0.4 μm filter paper to separate any calcium carbonate crystals, and the amount of calcium ions ("filtered calcium") was again measured by ICP spectroscopy in the filtered sample.

The unfiltered calcium is equivalent to the total calcium concentration in the water, and the filtered calcium reflects the amount of calcium dissolved in the bulk water. Thus, the difference between the unfiltered calcium and the filtered calcium represents the amount of calcium precipitated out of solution.

As shown in FIG. 1, as the pH increased and bulk phase $CaCO_3$ precipitation began to occur (as evident from the increased difference between the detected amount of unfiltered and filtered calcium), the modified DCA levels started to decrease as well. This demonstrated that detecting a decrease in the amount of modified DCA can serve as an early warning of $CaCO_3$ precipitation and trigger prompt corrective action. This provides the opportunity to safely operate at a more alkaline pH without concern for potential $CaCO_3$ scaling because any potential scaling can be detected very early, before the scale sticks to the heat exchanger surfaces. If the modified DCA levels start to drop, or drop below a predetermined threshold, this can be relayed to the modified DCA feed pump and the amount of modified DCA pumped into the system can be adjusted in order to mitigate the scale issues.

By contrast, it was found that the concentration of PTSA (inert tracer) did not change much with the onset of $CaCO_3$ precipitation as a function of increasing pH. Thus, monitoring with the modified DCA was found to be superior to the conventional method of monitoring with an inert fluorescent tracer.

Example 2

Effect of pH on Detected Amount of Modified DCA

Figure 2:
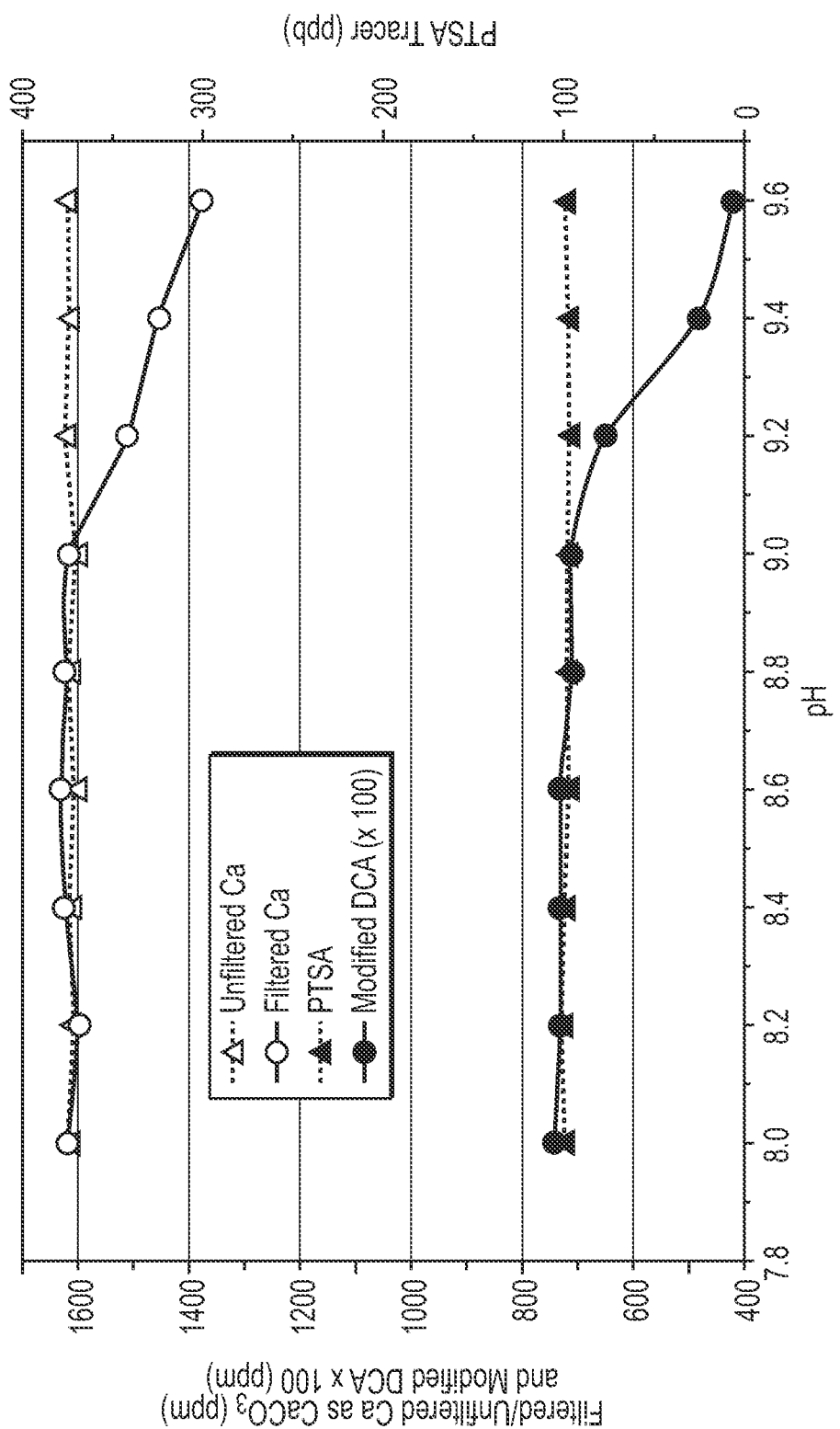
FIG. 2 is a graph illustrating the effect of pH on the detected amount of modified DCA with ~1600 ppm Ca as $CaCO_3$ in the water.

To confirm that the decrease in modified DCA levels in Example 1 was not just due to pH impact, another experiment was conducted at lower pH values and with a higher Ca concentration. The water chemistry contained 1600 ppm Ca as $CaCO_3$, 1200 ppm Mg as $CaCO_3$, 125 ppm M-alkalinity as $CaCO_3$, 300 ppm $SO_4^{-2}$, and 300 ppm $Cl^-$. 7.5 ppm modified DCA and 100 ppb PTSA were added to the water at 55° C. The results are shown in FIG. 2.

Here too, a detected decrease in the amount of modified DCA—but not inert tracer—correlated with an increasing difference between the detected amount of unfiltered and filtered calcium. However, the drop in modified DCA concentration occurred at a lower pH due to the higher calcium concentration in this test condition. This reflects that the decrease in modified DCA was due to the advent of scale formation and not the pH.

Example 3

Effect of $Ca_3(PO_4)_2$ Scale Formation on Modified DCA Concentration

In addition to bulk phase $CaCO_3$ precipitation, bulk phase $Ca_3(PO_4)_2$ precipitation is also well known in industrial water systems. Predicting the onset of $Ca_3(PO_4)_2$ precipitation is also very important. Thus, the influence of $Ca_3(PO_4)_2$ precipitation was also monitored with respect to modified DCA concentration as compared to an inert tracer.

Both a modified DCA and an inert fluorescent tracer were added to water with a water chemistry containing 500 ppm Ca as $CaCO_3$, 400 ppm Mg as $CaCO_3$, 100 ppm M-alkalinity as $CaCO_3$, 400 ppm $SO_4^{-2}$, 400 ppm $Cl^-$, and 5 ppm $O-PO_4$. In particular, 4 ppm modified DCA and 100 ppb PTSA were added to the water at 50° C. Additionally, 4 ppm of a phosphonate (phosphonobutanetricarboxylic acid, "PBTC"), a $CaCO_3$ scale inhibitor, was added to prevent any possibility of $CaCO_3$ scale formation. The solution was then titrated with 1N NaOH to increase the pH steadily. The amounts of modified DCA, PTSA, and both filtered and unfiltered $PO_4$ were measured with a fluorometer and by ICP spectroscopy as described in Example 1.

Figure 3:
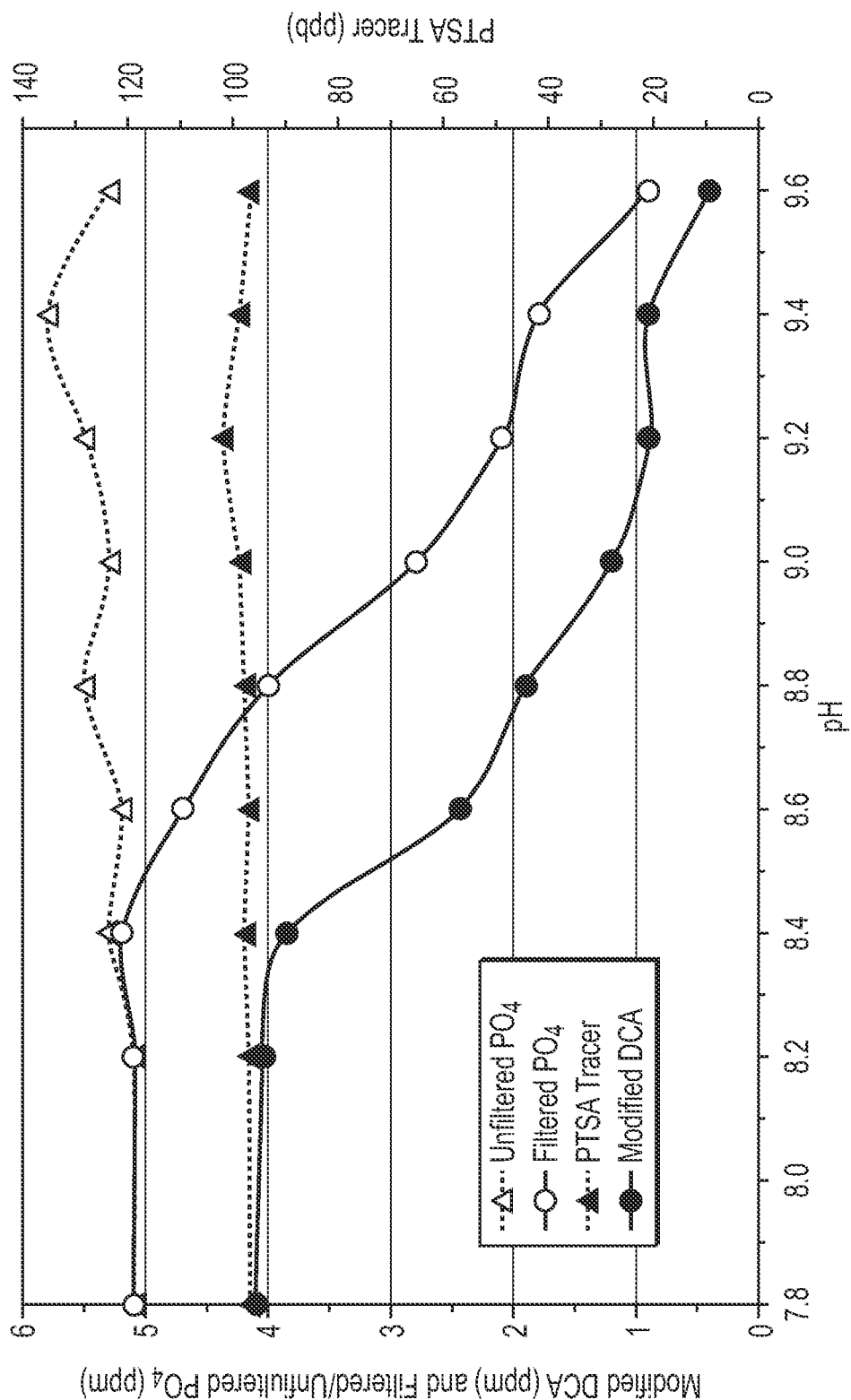
FIG. 3 is a graph illustrating the effect of $Ca_3(PO_4)_2$ scale formation on modified DCA concentration as compared to an inert tracer.

As shown in FIG. 3, as the pH increased and bulk phase $Ca_3(PO_4)_2$ precipitation began to occur (as evident from the increased difference between the detected amount of unfiltered and filtered $PO_4$), the modified DCA levels also started to decrease. This demonstrated that detecting a decrease in the amount of modified DCA can also serve as an early warning of $Ca_3(PO_4)_2$ precipitation. Thus, the modified DCA concentration can be monitored, controlled, and adjusted automatically in response to varying stress in the system.

It will be appreciated that the above-disclosed features and functions, or alternatives thereof, may be desirably combined into different methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method comprising:
    varying at least one condition of water in a water system while (i) measuring an amount of a polymeric deposit control agent (DCA) in the water to detect a change in the amount of the polymeric DCA in the water; and (ii) measuring scaling in the water system to detect a change in the amount of scaling; and
    correlating the detected change in the measured amount of the polymeric DCA with the detected change in scaling in the water,
    wherein the at least one varied condition of the water includes at least one of a pH of the water, a temperature of the water, a salt concentration of the water, and a flow rate of the water.

2. The method of claim 1, wherein scaling in the water is measured by measuring a precipitated amount of scale-forming salt calculated as a difference between a total unfiltered amount of scale-forming ionic species in the water and a filtered amount of scale-forming ionic species in a filtered sample of the water.

3. The method of claim 2, wherein the change in scaling includes the precipitated amount of scale-forming salt calculated to be more than 1% of the total unfiltered amount scale-forming ionic species in the water.

4. The method of claim 2, wherein the change in scaling includes the precipitated amount of scale-forming salt calculated to be more than 5% of the total unfiltered amount scale-forming ionic species in the water.

5. The method of claim 2, wherein the change in scaling includes the precipitated amount of scale-forming salt calculated to be more than 10% of the total unfiltered amount scale-forming ionic species in the water.

6. The method of claim 1, wherein the correlating includes identifying a threshold operating value of the at least one condition where the detected change in the measured amount of the polymeric DCA substantially coincides with the detected change in scaling.

7. The method of claim 6, further comprising, after the correlating:
    operating the water system so that the at least one condition does not surpass the threshold operating value.

8. The method of claim 7, wherein the operating includes adjusting an operating parameter of the water system selected from the group consisting of a pH of the water, a temperature of the water, a mineral hardness of the water, and a dosage of the polymeric DCA added to the water.

9. The method of claim 1, wherein the correlating includes identifying a threshold change in the measured amount of the polymeric DCA that coincides with the detected change in scaling.

10. The method of claim 9, wherein the threshold change in the measured amount of the polymeric DCA is selected from the group consisting of:
    a decrease in the measured amount of the polymeric DCA, and
    a rate of decrease in the measured amount of the polymeric DCA.

11. The method of claim 1, wherein the at least one varied condition of the water includes at least one of a temperature of the water a salt concentration of the water, and a flow rate of the water.

12. The method of claim 1, wherein the polymeric DCA has an electronegative group.

13. The method of claim 1, wherein the polymeric DCA has a functional group selected from the group consisting of a carboxyl group, a sulfonate group, an amide group, and a hydroxyl group.

14. The method of claim 1, wherein the polymeric DCA comprises an acrylate polymer having a weight-average molecular weight of 15,000 g/mol or less.

15. The method of claim 1, wherein the polymeric DCA comprises a chemically or optically detectable component.

* * * * *